UNITED STATES PATENT OFFICE.

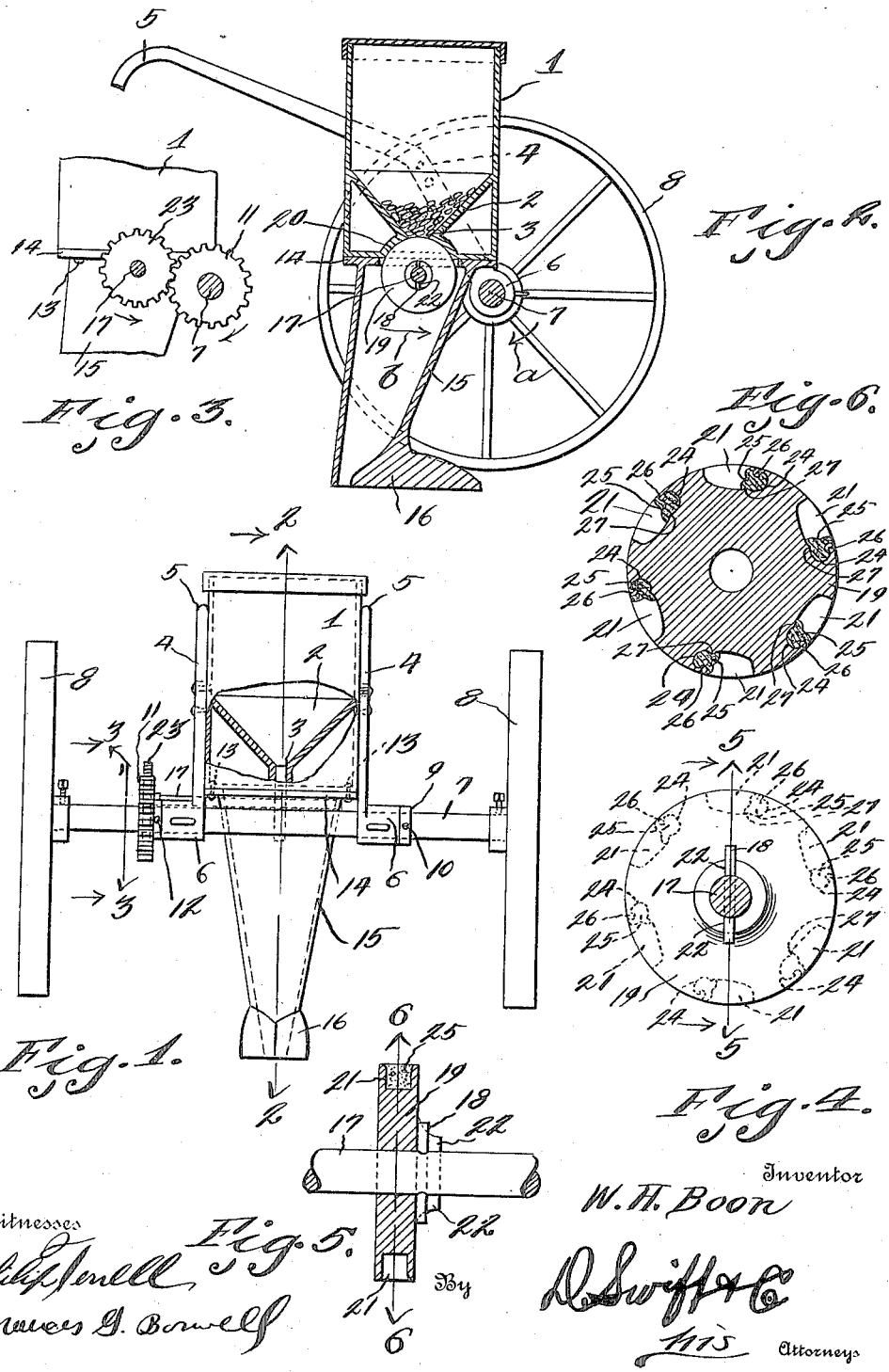

WALTER H. BOON, OF CARBON, TEXAS.

PLANTER.

1,213,830.

Specification of Letters Patent.     Patented Jan. 30, 1917.

Application filed August 31, 1916. Serial No. 117,904.

*To all whom it may concern:*

Be it known that I, WALTER H. BOON, a citizen of the United States, residing at Carbon, in the county of Eastland, State of Texas, have invented a new and useful Planter; and I do hereby declare the following to be a full, clear, and exact description of the invention, such as will enable others skilled in the art to which it appertains to make and use the same.

This invention relates to the art of planters and particularly to an improved machine, more especially adapted for planting peanuts and other seeds, which are more or less easily crushable, and an object of the invention is to provide a seed receptacle and a seed chute, in combination with a drop feed wheel rotatable between the chute and the receptacle, to feed the seeds or the peanuts from the receptacle through the chute, there being connections between the drop feed wheel and the supporting driving axle of the machine, for operating the feed wheel.

A further object of the invention is to provide a drop feed wheel having pockets in its periphery, which pockets have cavities in which paddings are secured in any suitable manner, so that in case the seeds or peanuts bind between the restricted throat of the seed receptacle and those ends of the pockets where the cavities are formed, the paddings or cushion will yield, thereby preventing crushing of the peanuts or other seeds.

In practical fields, the details of construction may necessitate alterations falling within the scope of what is claimed.

The invention comprises further features and combination of parts, as hereinafter set forth, shown in the drawings, and claimed.

In the drawings: Figure 1 is a view in front elevation of a seed or peanut planter constructed in accordance with the invention, showing parts in section. Fig. 2 is a sectional view on line 2—2 of Fig. 1. Fig. 3 is a sectional view on line 3—3 of Fig. 1. Fig. 4 is a view in side elevation of the drop feed wheel of the planter. Fig. 5 is a sectional view on line 5—5 of Fig. 4. Fig. 6 is a sectional view on line 6—6 of Fig. 5.

Referring more especially to the drawings, 1 designates a seed receptacle, which may receive any kind of seed to be planted, or peanuts, and is provided with a conical bottom 2 having a restricted throat 3 at its lower end. Secured to the opposite sides of the receptacle 1 are bars 4, the rear portions of which terminate in handles 5, while the forward lower portions terminate in bearings 6 for the reception of the drive axle 7, on the opposite ends of which the supporting wheels 8 are journaled to rotate with the axle. A collar 9 is secured on the axle 7 by the pin 10, to prevent movement of the axle axially in one direction through the bearings 6. A gear 11 is provided, which is secured on the axle or shaft 7 by the pin 12 which passes through the hub of said gear thereby holding the gear so as to prevent the axle from moving axially through the bearings in the opposite direction. Secured by the bolts 13 to the bottom of the receptacle 1 is the top plate 14, which is integral with the seed chute 15, which terminates at its lower portion in the usual shoe 16. Mounted in bearings of the upper part of said chute is a shaft 17, on which is secured by means of a pin 18, a drop feed wheel 19, a portion of the periphery of which rotates in the semi-circular cavity 20 of the bottom of the receptacle 1, so that the pockets 21 of said feed wheel will pass successively by the restricted throat 3 of the conical bottom of said receptacle, so that the seeds or peanuts will fall one at a time into said pockets. The pin 18 passes through the shaft 17 and its opposite ends engage the slots or recesses 22 of the hub of the drop feed wheel. On one end of the shaft 17 is a gear 23 meshing with the gear 11, so that when the supporting wheels 8 move in the direction of the arrow *a*, the shaft 17 will rotate in the opposite direction, and carry or rotate the drop feed wheel in the direction of the arrow *b*, so that the seeds or peanuts will pass from the receptacle through said chute. Each pocket 21 of the drop feed wheel has a cavity 24 at one end, for the reception of a pad or cushion of any suitable material, preferably soft yieldable felt. This pad or cushion 25 may be secured in the cavity in any suitable manner, preferably by some suitable adhesive material. The pad or cushion is additionally held in the cavity by the projections 26 and 27. It is to be observed that should the peanuts tend to bind or clog between one side of the restricted throat 3 and the end of each pocket having the cushion, the cushion will yield, thereby preventing the peanuts from crushing. Owing to the padding or cushion, the peanuts will be prevented from binding or clogging in the pockets, and then allowed to drop through the chute and planted in the furrow.

The invention having been set forth, what is claimed as new and useful, is:—

In a peanut planter, the combination of a seed receptacle having a restricted throat in its bottom and a drop feed wheel having pockets in its periphery, of means for rotating the feed wheel, whereby the pockets will move past and adjacent said throat, each pocket at one end having a cavity, a cushion adhesively secured in said cavity, said pockets having projections adjacent the cavity to additionally secure the cushion in place, and over which projections said cushion engages.

In testimony whereof I have signed my name to this specification in the presence of two subscribing witnesses.

WALTER H. BOON.

Witnesses:
W. A. TATE,
F. J. STUBBLEFIELD.

Copies of this patent may be obtained for five cents each, by addressing the "Commissioner of Patents Washington, D. C."